(12) United States Patent
Nakahama

(10) Patent No.: US 10,215,663 B2
(45) Date of Patent: Feb. 26, 2019

(54) DEVICE AND SPECIFICATION METHOD

(71) Applicant: NEC Corporation, Minato-ku, Tokyo (JP)

(72) Inventor: Masahiko Nakahama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/736,356

(22) PCT Filed: Jun. 17, 2016

(86) PCT No.: PCT/JP2016/002929
§ 371 (c)(1),
(2) Date: Dec. 14, 2017

(87) PCT Pub. No.: WO2016/208169
PCT Pub. Date: Dec. 29, 2016

(65) Prior Publication Data
US 2018/0188135 A1    Jul. 5, 2018

(30) Foreign Application Priority Data

Jun. 25, 2015   (JP) .................................. 2015-128091

(51) Int. Cl.
*G01M 11/00*   (2006.01)

(52) U.S. Cl.
CPC ........ *G01M 11/3109* (2013.01); *G01M 11/00* (2013.01)

(58) Field of Classification Search
CPC .............................................. G01M 11/3109
(Continued)

(56) References Cited

U.S. PATENT DOCUMENTS

| 5,903,375 A | 5/1999 | Horiuchi et al. |
| 6,185,020 B1 | 2/2001 | Horiuchi et al. |
| 2009/0180099 A1 | 7/2009 | Kurokawa |

FOREIGN PATENT DOCUMENTS

| CN | 101964682 A | 2/2011 |
| JP | S55-10855 A | 3/1980 |

(Continued)

OTHER PUBLICATIONS

International Search Report for PCT Application No. PCT/JP2016/002929, dated Aug. 30, 2016.
(Continued)

*Primary Examiner* — Tri T Ton

(57) ABSTRACT

The present invention addresses the problem of the inability to sufficiently reduce manufacturing cost for specifying a faulty section of an optical fiber. The device according to the present invention is a device connected to an optical fiber into which light reflection elements that reflect a fixed amount of light are inserted, said device being provided with a transmission means for transmitting light to the optical fiber and stopping the transmission, a measurement means for measuring the intensity of the reflection light reflected by the light reflection elements, a time measurement means for measuring the time from the stopping of the transmission of the light by the transmission means to the reduction of the intensity of the reflection light measured by the measurement means to a prescribed value or less, a distance measurement means for calculating a distance corresponding to the time measured by the time measurement means, and an output means for outputting a signal indicating the distance.

11 Claims, 7 Drawing Sheets

DIAGRAM FOR DESCRIBING EQUIPMENT CONNECTED TO OPTICAL TRANSMITTING/RECEIVING DEVICE OF FIRST EXAMPLE EMBODIMENT

(58) Field of Classification Search
USPC .......................................................... 356/73.1
See application file for complete search history.

(56) References Cited

FOREIGN PATENT DOCUMENTS

| | | |
|---|---|---|
| JP | H09-200132 A | 7/1997 |
| JP | H10-51401 A | 2/1998 |
| WO | 2007/108330 A1 | 9/2007 |

OTHER PUBLICATIONS

English translation of Written opinion for PCT Application No. PCT/JP2016/002929.
Japanese Office Action for JP Application No. 2017-524628 dated Jun. 26, 2018 with English Translation.

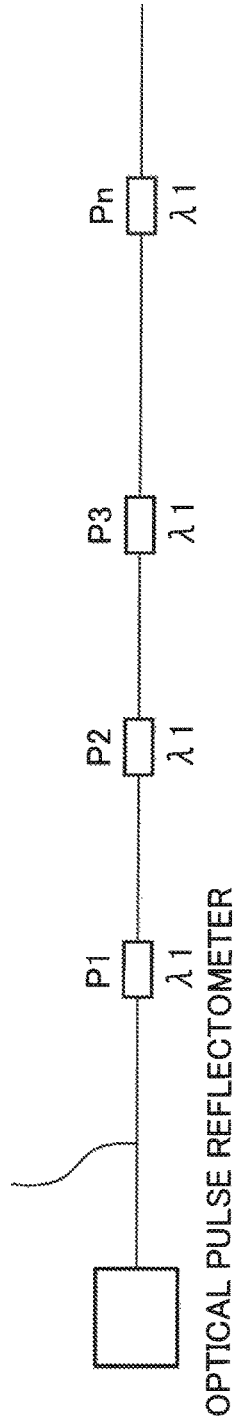
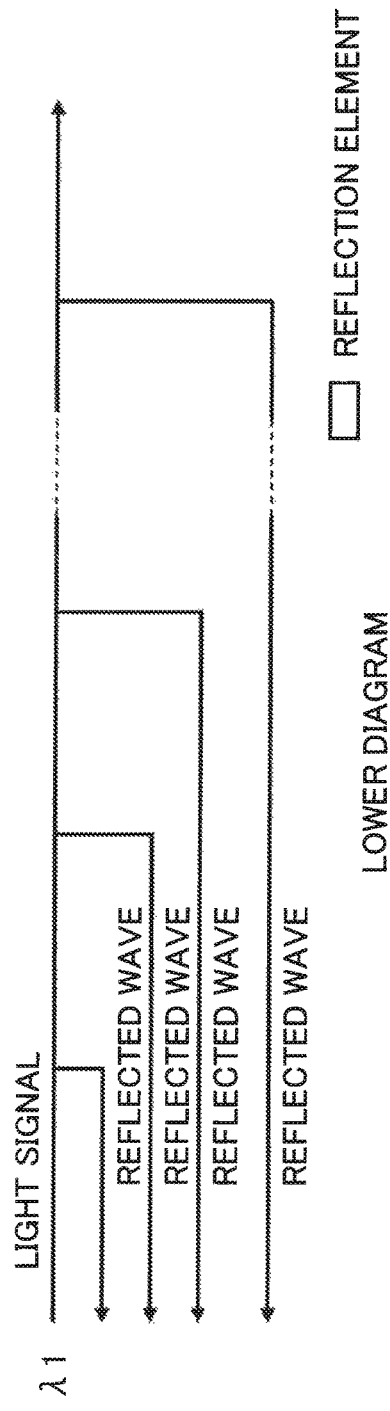
Fig.1
DIAGRAM FOR DESCRIBING OPERATION OF OPTICAL PULSE REFLECTOMETER OF PTL 1

DIAGRAM FOR DESCRIBING LIGHT REFLECTION ELEMENT CONNECTED TO OPTICAL TRANSMITTING/RECEIVING DEVICE OF FIRST EXAMPLE EMBODIMENT

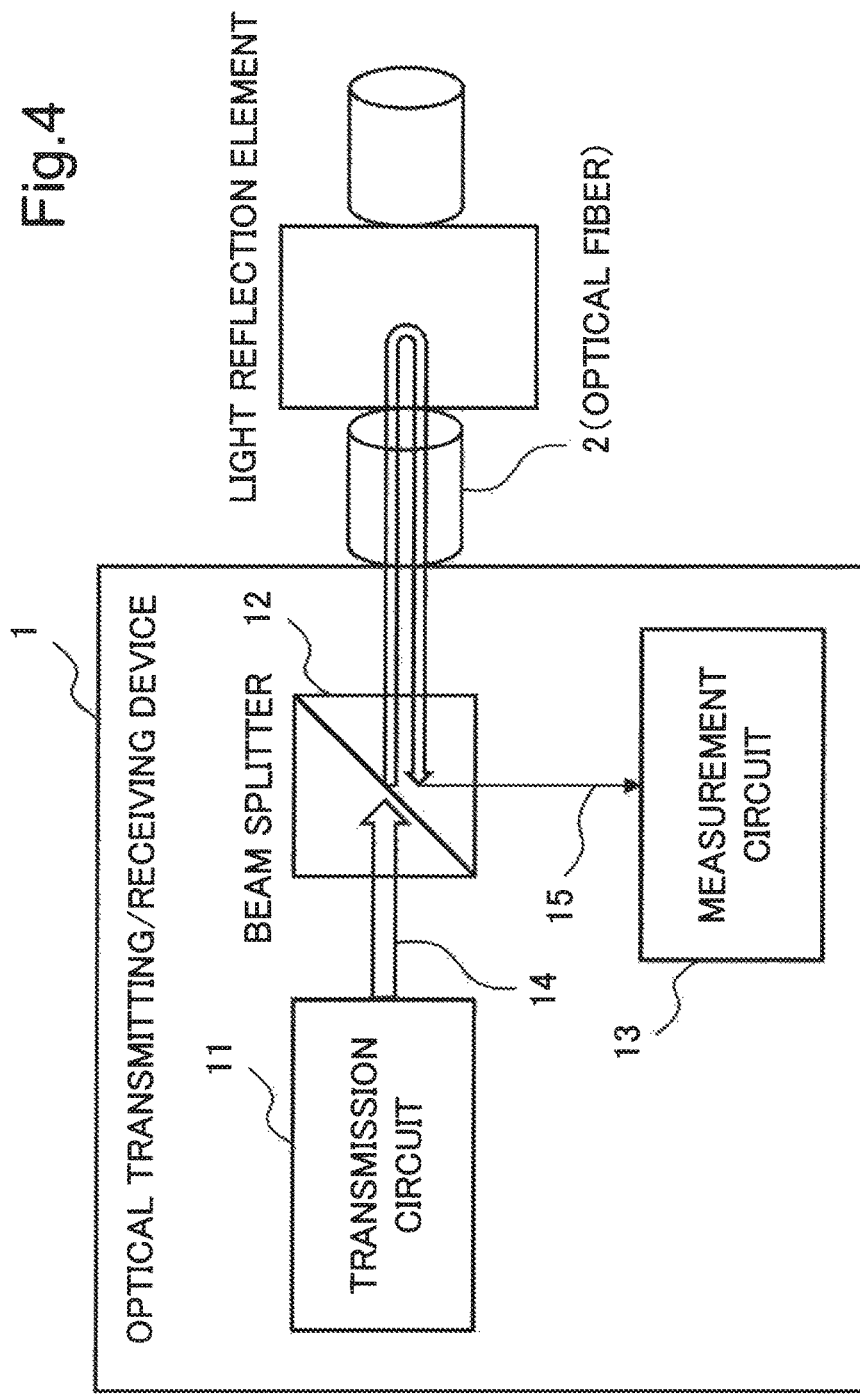

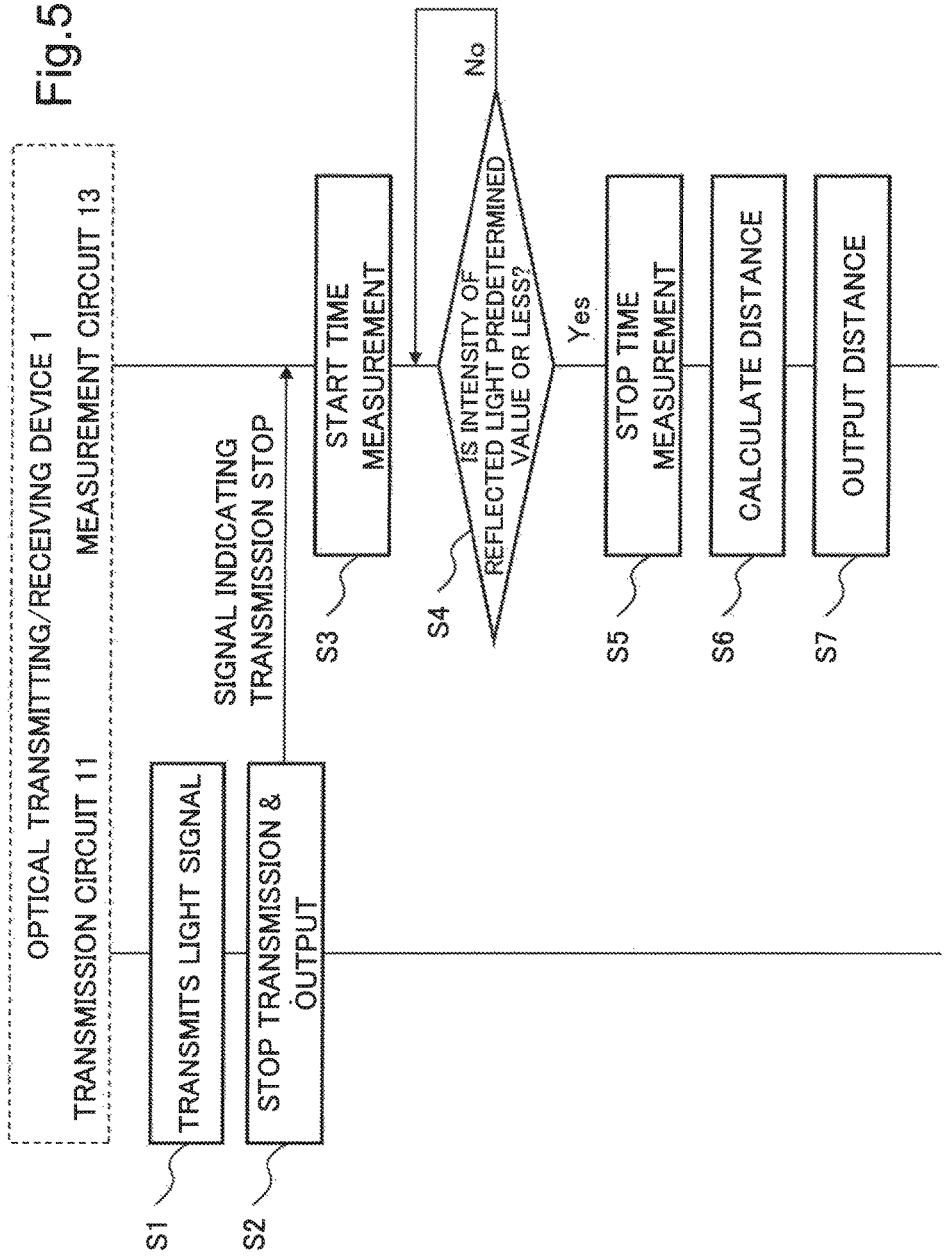

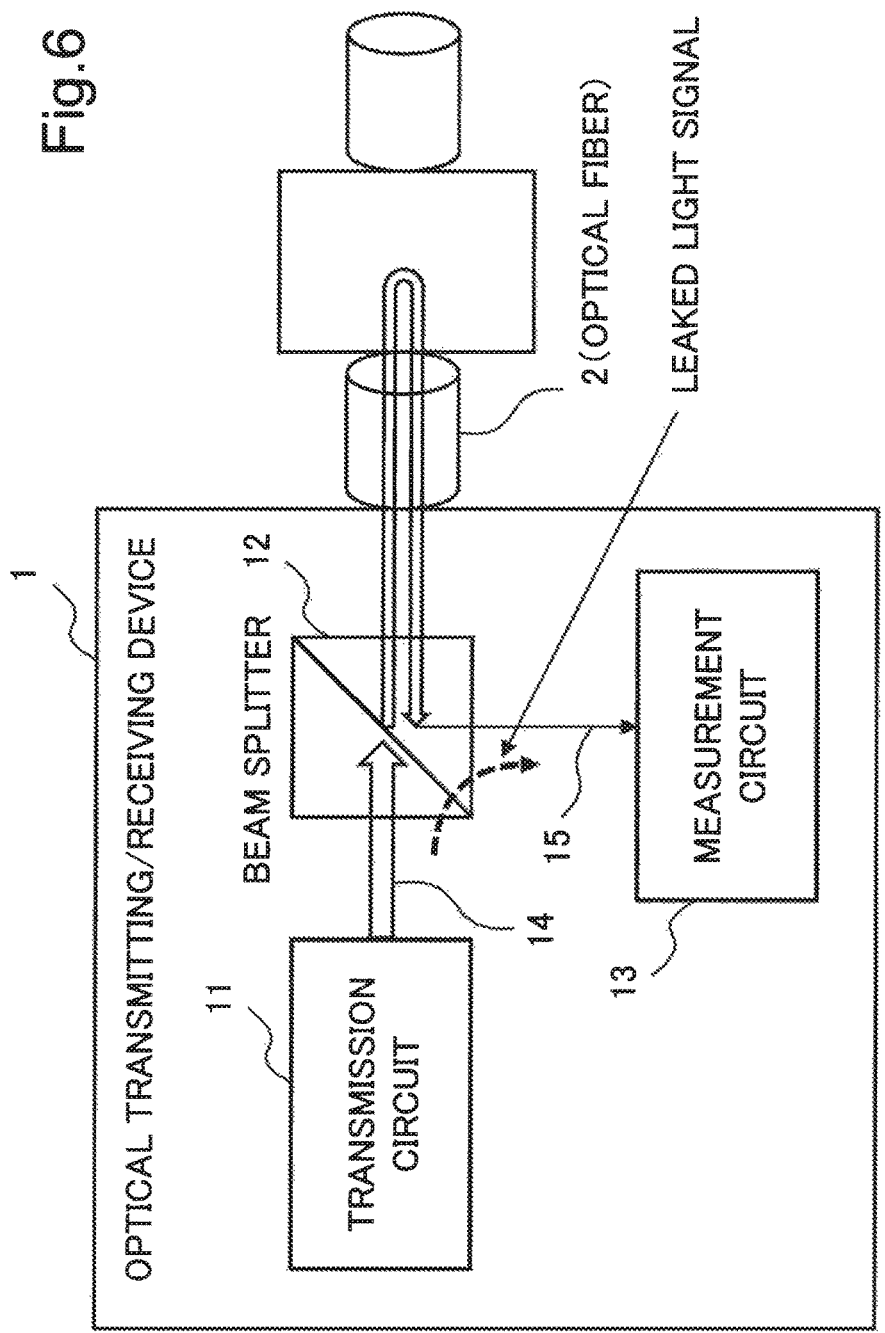

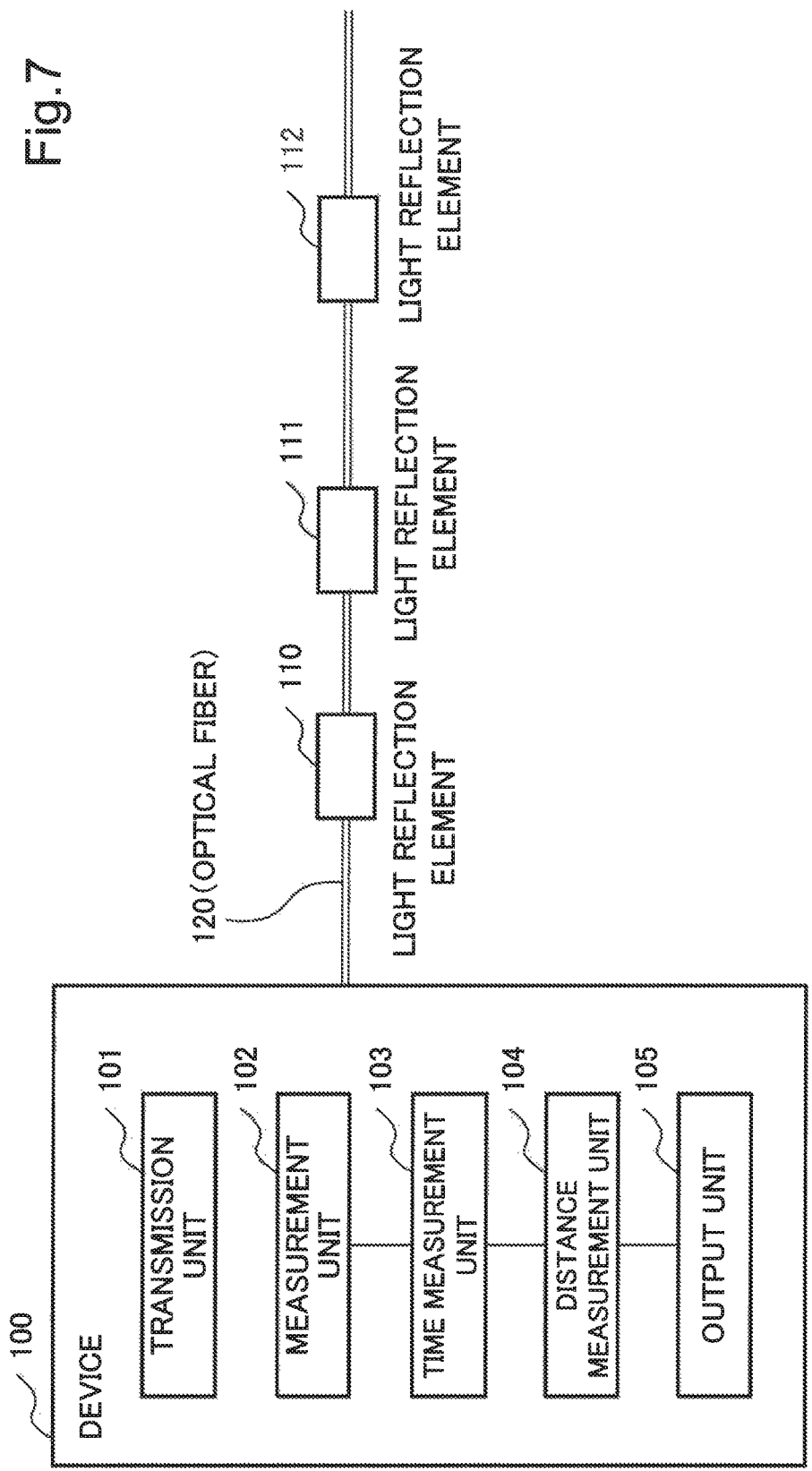

DEVICE AND SPECIFICATION METHOD

This application is a National Stage Entry of PCT/JP2016/002929 filed on Jun. 17, 2016, which claims priority from Japanese Patent Application 2015-128091 filed on Jun. 25, 2015, the contents of all of which are incorporated herein by reference, in their entirety.

TECHNICAL FIELD

The present invention relates to a device and a specifying method, and, more particularly, to a device and a specifying method which specify a faulty section of an optical fiber.

BACKGROUND ART

Technology to specify a faulty section of an optical fiber is generally known. A technology to specify a faulty section of an optical fiber is disclosed in the following PTL 1. FIG. 1 is a diagram for describing a structure and an operation of an optical pulse reflectometer of PTL 1.

The optical pulse reflectometer of PTL 1 is connected to an optical fiber line as illustrated in the upper diagram of FIG. 1. A plurality of light reflection elements P1, P2, ... Pn that perform reflection of only a specific wavelength signal of a fixed amount are inserted into the optical fiber line. As indicated in the lower diagram of FIG. 1, the optical pulse reflectometer of PTL 1 transmits a specific wavelength signal (a light signal of a specific wavelength $\lambda 1$) to the optical fiber line, and measures the level of reflected light at each predetermined time when reflected light from each light reflection element would reach. Reflected light from each light reflection element is reflected light of the same wavelength $\lambda 1$. About a time in which reflected light of a predetermined level has not been detected due to a failure existing in the optical fiber, the optical pulse reflectometer of PTL 1 identifies that a failure has occurred in a position up to the position where a light reflection element corresponding to the time is inserted. About a time in which reflected light of a predetermined level has been detected, the optical pulse reflectometer of PTL 1 supposes that there are no failures up to the position where a light reflection element corresponding to the time is inserted.

As indicated by the aforementioned constitution and the operations, the optical pulse reflectometer of PTL 1 can specify a faulty section of an optical fiber.

CITATION LIST

Patent Literature

[PTL 1] Japanese Patent Application Laid-Open No. 1997-200132
[PTL 2] WO 2007/108330

SUMMARY OF INVENTION

Technical Problem

However, when specifying a faulty section of an optical fiber, an optical pulse reflectometer of PTL 1 has an issue that its manufacturing cost cannot be reduced sufficiently.

The reason will be described below.

First, when an optical pulse reflectometer of PTL 1 transmits a light signal for a long time, reflected light of the same wavelength is returned in an overlapping manner to the optical pulse reflectometer of PTL 1 from each light reflection element. Since, when reflected light of the same wavelength has been returned in an overlapping manner, there are no means to distinguish from which light reflection element the reflected light has come, the optical pulse reflectometer of PTL 1 cannot specify a faulty section of an optical fiber line. For example, when a light signal is transmitted for a long time when a failure has occurred between the light reflection elements P3 and P4, the optical pulse reflectometer of PTL 1 will receive reflected light of the same wavelength from each of light reflection elements P1, P2 and P3. However, in the optical pulse reflectometer of PTL 1, there are no means to distinguish from which light reflection element the reflected light has come. Therefore, the optical pulse reflectometer of PTL 1 detects reflected light received from the light reflection elements P1, P2 and P3 as reflected light from the light reflection element P4 at the time when reflected light from the light reflection element P4 is supposed to have reached, and distinguishes that there is no failure up to the light reflection element P4. An optical pulse reflectometer of PTL 1 cannot specify a faulty section of an optical fiber line when reflected light of the same wavelength returns in an overlapping manner. In order to specify a faulty section, the optical pulse reflectometer of PTL 1 needs to control a transmission time of a light signal strictly in such a way that each piece of reflected light does not overlap with each other. As a result, the optical pulse reflectometer of PTL 1 has to have a circuit for controlling a transmission time of a light signal strictly (such as a pulse signal generator, and the like), and there has been an issue that its manufacturing cost cannot be reduced sufficiently.

The present invention aims to provide a device and a specifying method that solves the above-described problems.

Solution to Problem

To achieve the above-described object, a device of the present invention is connected to an optical fiber into which a light reflection element to perform reflection of light of a fixed amount is inserted, and comprises: a transmission means for transmitting light to the optical fiber, and stopping the transmission; a measurement means for measuring intensity of reflected light reflected from the light reflection element; a time measurement means for measuring a time until intensity of the reflected light to be measured by the measurement means comes to be a predetermined value or less after the transmission means stops transmission of the light; a distance measurement means for calculating a distance corresponding to the time having been measured by the time measurement means; and an output means for outputting a signal indicating the distance, wherein the predetermined value is equal to or more than intensity of the reflected light when not transmitting the light, and is a value smaller than intensity of the reflected light to be received from the light reflection element inserted farthest when the light is transmitted.

To achieve the above-described object, a specifying method of the present invention comprises: transmitting light to an optical fiber into which a light reflection element to perform reflection of light of a fixed amount is inserted; measuring intensity of reflected light reflected from the light reflection element; stopping transmission of the light; measuring a time until intensity of the reflected light to be measured comes to be a predetermined value or less after stopping of transmission of the light; calculating a distance corresponding to the measured time; and outputting a signal indicating the distance, wherein the predetermined value is equal to or more than intensity of the reflected light when not transmitting the light, and is a value smaller than intensity of the reflected light to be received from the light reflection element inserted farthest when the light is transmitted.

Advantageous Effects of Invention

According to the present invention, when a faulty section of an optical fiber is specified, the manufacturing cost of a device can be reduced sufficiently.

BRIEF DESCRIPTION OF DRAWINGS

FIG. 1 is a diagram for describing a structure and an operation of an optical pulse reflectometer of PTL 1.

FIG. 4 is a diagram illustrating an example configuration of an optical transmitting/receiving device in the first example embodiment of the present invention.

FIG. 5 is a flow chart illustrating an operation of an optical transmitting/receiving device in the first example embodiment of the present invention.

FIG. 6 is a diagram for describing an effect of an optical transmitting/receiving device in the first example embodiment of the present invention.

FIG. 7 is a diagram illustrating an example configuration of a device in a second example embodiment of the present invention.

DESCRIPTION OF EMBODIMENTS

Next, example embodiments of the present invention will be described in detail with reference to the drawings.

First Example Embodiment

[Outline]

An optical transmitting/receiving device of this example embodiment transmits light for a suitable time to an optical fiber into which a plurality of light reflection elements to perform reflection of light of a fixed amount are inserted. Such transmission of light is performed when there is a failure in the optical fiber. By the transmission of light, an optical transmitting/receiving device of this example embodiment receives reflected light of a same wavelength from each light reflection element in a superposed manner. After that, the optical transmitting/receiving device stops transmission of light and measures a time until reflected light comes not to be received at all anymore. The measured time corresponds to a time during which light goes to and then returns from the farthest light reflection element that is still connected even after the failure. The optical transmitting/receiving device calculates the distance to the farthest light reflection element that is still connected even after the failure based on the measured time. The calculated distance is information which indicates that there is a failure in a section farther than that, that is, information which specifies a faulty section. For specifying a faulty section, it is not necessary for an optical transmitting/receiving device of this example embodiment to strictly control transmission time of light in order not to make reflected light be overlapped, and a circuit for that is not needed. Therefore, the optical transmitting/receiving device of this example embodiment can reduce the manufacturing cost sufficiently.

[Description of a Structure]

Figure 2:
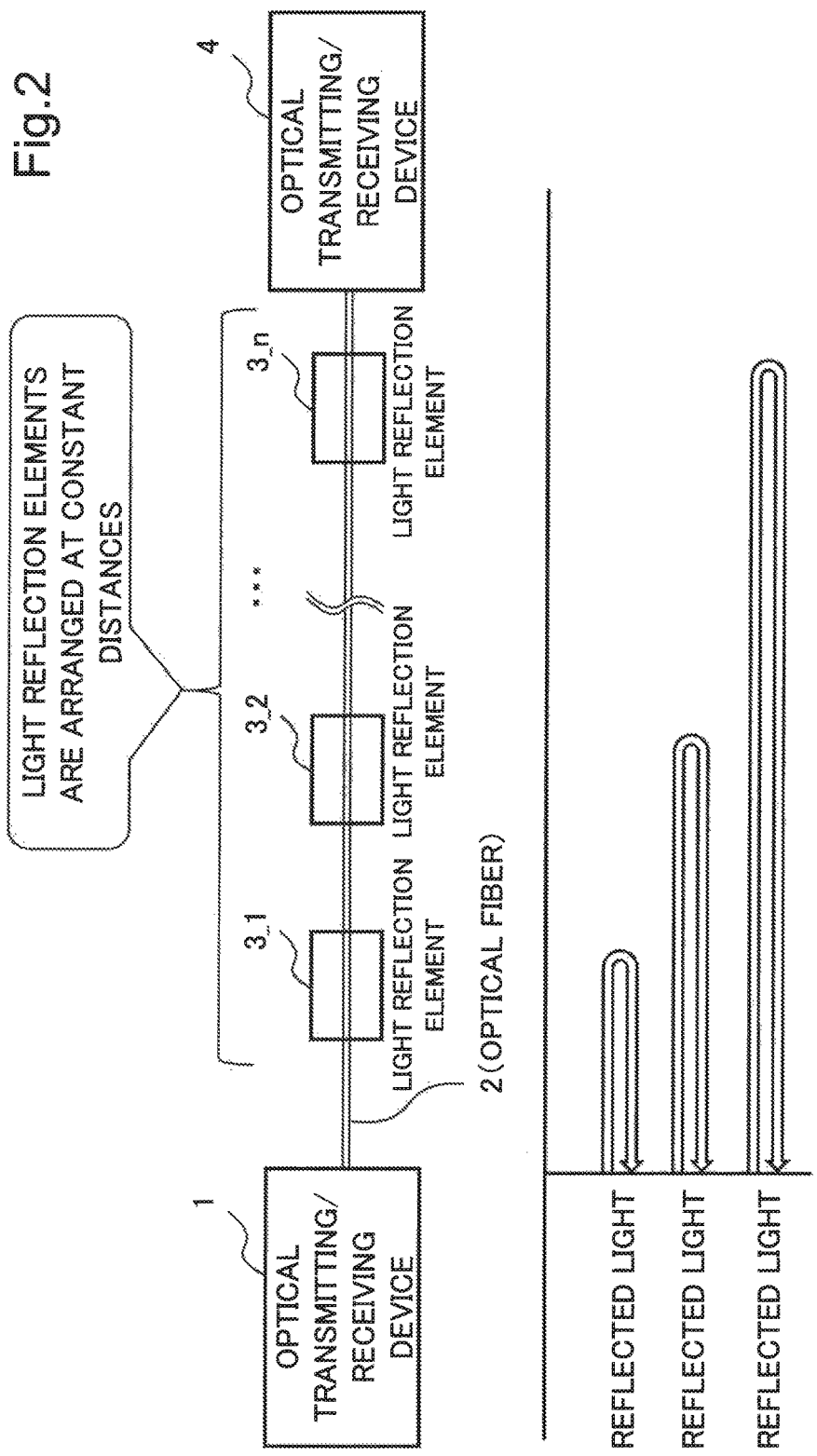
FIG. 2 is a diagram for describing equipment connected to an optical transmitting/receiving device in a first example embodiment of the present invention.
Figure 3:
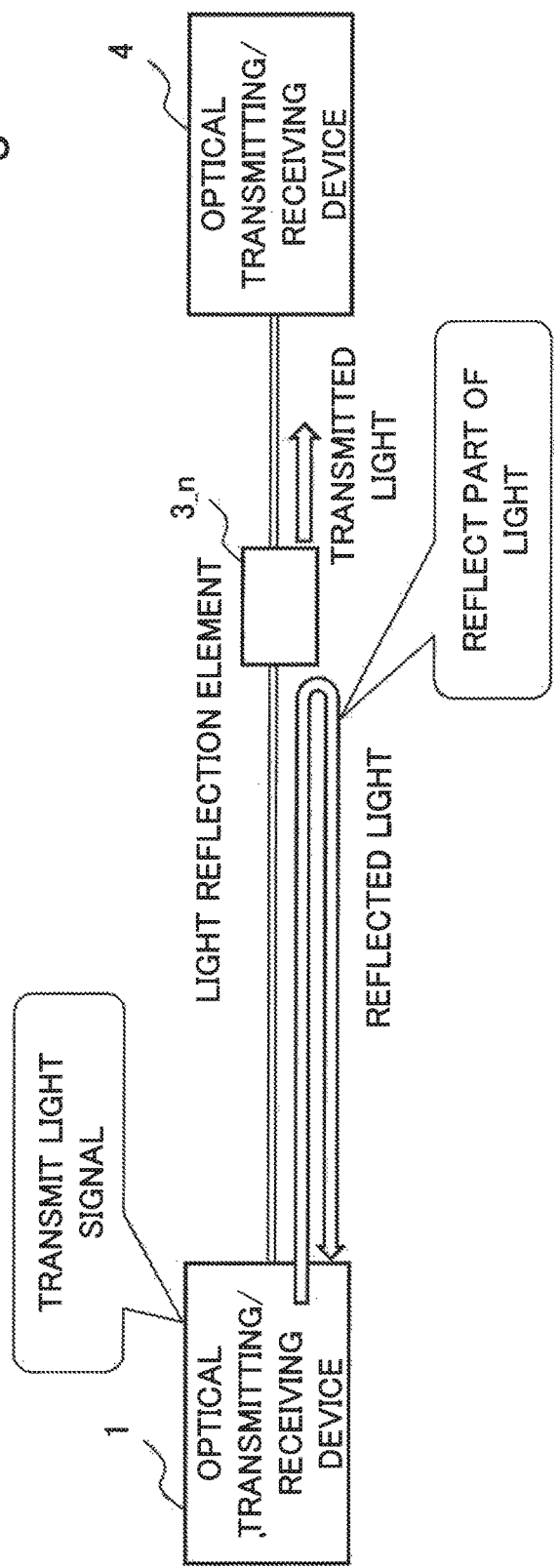
FIG. 3 is a diagram for describing a light reflection element connected to an optical transmitting/receiving device in the first example embodiment of the present invention.

FIG. 2 is a diagram for describing equipment connected to an optical transmitting/receiving device in the first example embodiment of the present invention. FIG. 3 is a diagram for describing a light reflection element connected to an optical transmitting/receiving device in the first example embodiment of the present invention.

(1) Regarding Equipment Connected to an Optical Transmitting/Receiving Device 1

First, as illustrated in FIG. 2, an optical fiber 2 is connected to an optical transmitting/receiving device 1 of this example embodiment. To the optical fiber 2, a plurality of light reflection elements $3\_1, 3\_2, \ldots 3\_n$ (n is a number from 1 to the number of light reflection elements) are inserted at constant distances. The above light reflection elements $3\_1, 3\_2, \ldots 3\_n$ are elements which perform, when light is incident from the optical transmitting/receiving device 1 as illustrated in FIG. 3, reflection of part of the light of a fixed amount and make the rest penetrate through as transmitted light. Specifically, they are optical fiber gratings. The optical fiber grating may be provided in the optical fiber 2 by the well-known phase mask method. A reflectivity of the optical fiber grating may be about 1%-10%. The optical transmitting/receiving device 1 is connected to the optical fiber 2 in which an optical fiber grating is provided for each constant distance.

Meanwhile, an end of the optical fiber 2 may be connected to another optical transmitting/receiving device 4 as is illustrated in FIG. 2.

(2) Structure of the Optical Transmitting/Receiving Device 1

FIG. 4 is a diagram illustrating an example configuration of the optical transmitting/receiving device 1 in the first example embodiment of the present invention.

The optical transmitting/receiving device 1 includes a transmission circuit 11, a beam splitter 12 and a measurement circuit 13 as is illustrated in FIG. 4.

The transmission circuit 11 is connected to the optical fiber 2 via an optical fiber 14 and the beam splitter 12. The measurement circuit 13 is connected to the optical fiber 2 via an optical fiber 15 and the beam splitter 12. Although not being illustrated, the transmission circuit 11 is connected to the measurement circuit 13 via a conducting wire.

(3) Function of Each Part of the Optical Transmitting/Receiving Device 1

(3-1) Optical Transmission Function

When a signal which indicates a transmission start is inputted, the transmission circuit 11 transmits light (that is, a light signal of a constant level) to the optical fiber 2.

The above signal which indicates a transmission start may be inputted from a monitoring device (not shown) connected to the transmission circuit 11. When a failure occurs in the optical fiber 2, an operator of the monitoring device inputs a signal indicating a transmission start to the transmission circuit 11 from the monitoring device.

(3-2) Transmission Stop Function

The transmission circuit 11 transmits light, and, after the lapse of a predetermined time, stops transmission of light. When the transmission of light is stopped, the transmission circuit 11 outputs a signal which indicates a transmission stop to the measurement circuit 13.

The above-mentioned predetermined time is set by a user of the optical transmitting/receiving device 1 of this example embodiment to the transmission circuit 11. A user of the optical transmitting/receiving device 1 of this example embodiment may set an optional time (3 seconds, for example) to the transmission circuit 11.

(3-3) Clocking Function

The measurement circuit 13 has a clocking function. When a signal which indicates a transmission stop is inputted, the measurement circuit 13 begins to measure a time by the clocking function. The reason of this is in order to measure a time after transmission has been stopped.

(3-4) Reflected Light Measuring Function

The measurement circuit 13 receives reflected light via the beam splitter 12.

The measurement circuit 13 measures the intensity of reflected light to be received at predetermined timing.

The above predetermined timing is timing of regular intervals and is set by a user of the optical transmitting/receiving device 1 of this example embodiment to the measurement circuit 13. It is desirable that the predetermined timing be a timing of a shorter interval, and, a user of the optical transmitting/receiving device 1 of this example embodiment may set timing of every some tens of microseconds to the measurement circuit 13 as the predetermined timing.

In order to measure the intensity of reflected light, the measurement circuit 13 may include a general light receiving element and an AD (Analog to Digital) converter. In this case, the light receiving element is provided at a position where reflected light is received. The AD converter reads the intensity of an electric signal (analog signal) to be outputted from the light receiving element at each predetermined timing (some tens of microseconds, for example) and writes the read value in a memory in the measurement circuit 13. A value to be written in the memory (hereinafter, referred to as "storage memory") in the measurement circuit 13 is a value which indicates the intensity of reflected light. By the light receiving element and the AD converter, the measurement circuit 13 can measure the intensity of reflected light at each predetermined timing.

A reflected light measuring function operates in parallel with the other functions (clocking function, for example).

(3-5) Clocking Stop Function

When reflected light comes not to be received any more, the measurement circuit 13 stops measurement of a time. Specifically, when the intensity of reflected light last measured by the reflected light measuring function (a value last written in the storage memory) becomes equal to or lower than a predetermined value, the measurement circuit 13 stops the clocking function and suspends measurement of a time.

The above-mentioned predetermined value is the intensity of reflected light when not receiving reflected light, and is set by a user of the optical transmitting/receiving device 1 of this example embodiment to the measurement circuit 13 in advance. A user of the optical transmitting/receiving device 1 may set the intensity of reflected light measured by the reflected light measuring function when there is no failure in the optical fiber 2 and the transmission circuit 11 is not transmitting light to the measurement circuit 13 as the predetermined value.

(3-6) About a Time Measured Up to Clocking Function Stop

The time measured by the clocking function up to the clocking function stop is a time until reflected light comes not to be received any more after transmission of light is stopped. The time is a time during which stopping of transmission of light is propagated to the farthest connected light reflection element as light, and the light is reflected and returned, and it corresponds to a time during which light makes a round trip to the farthest connected light reflection element.

(3-7) Distance Calculation Function

The measurement circuit 13 calculates the distance to the farthest connected light reflection element based on a measured time.

Specifically, the measurement circuit 13 calculates the product of half of the measured time (that is, the time during which light makes a round trip to the farthest connected light reflection element) and a speed at which light travels in the optical fiber. The speed at which light travels in the optical fiber can be obtained by dividing the speed of light by the refractive index of the optical fiber. The speed at which light travels in the optical fiber is calculated by a user of the optical transmitting/receiving device 1 of this example embodiment in advance, and is set to the measurement circuit 13.

For example, in the case of an optical fiber using a general silica glass, the refractive index is 1.458 and the speed of light is 29973.458 [km/s], and, thus, the speed at which light travels in the optical fiber is 20557.927 [km/s]. When connecting an optical fiber that uses a general silica glass to the optical transmitting/receiving device 1, a user of the optical transmitting/receiving device 1 of this example embodiment sets 20557.927 [km/s] to the measurement circuit 13.

(3-8) Output Function

The measurement circuit 13 outputs the distance to the farthest connected light reflection element that has been calculated as a signal.

(4) About a Realization Means of Each Part

The transmission circuit 11 can be realized using a laser diode, an optical fiber and an electronic circuit. The measurement circuit 13 can be realized using an electronic circuit, a memory such as RAM (Random Access Memory), a light receiving element, an AD converter, an optical fiber and an optical adapter.

[Description of Operations]

FIG. 5 is a flow chart illustrating operations of the optical transmitting/receiving device 1 in the first example embodiment of the present invention. Detailed operations of the optical transmitting/receiving device 1 of this example embodiment will be described below using FIG. 5.

(1) Transmission and Stopping of Light

First, it is supposed that a failure has occurred in the optical fiber 2 and communication has become unable to be carried out normally any more. It is assumed that any portion of the optical fiber 2 has been broken. At that time, it is supposed that an operator of a monitoring device (not shown) has output a signal which indicates a transmission start from the monitoring device (not shown) to the transmission circuit 11. The signal which indicates a transmission start is inputted to the transmission circuit 11.

When the signal which indicates a transmission start is inputted, the transmission circuit 11 of the optical transmitting/receiving device 1 transmits light to the optical fiber 2 (S1), as indicated in FIG. 5. The light is a light signal of a constant level.

By the processing of S1, reflected light of the same wavelength is returned from each of the light reflection elements 3_1, 3_2, . . . 3_n to the optical transmitting/receiving device 1. The measurement circuit 13 of the optical transmitting/receiving device 1 receives reflected light from each of the light reflection elements 3_1, 3_2, . . . 3_n in a superposed manner. At that time, the measurement circuit 13 is measuring the intensity of reflected light to be received repeatedly at regular intervals as it has been described in the above-mentioned "(3-4) Reflected light measuring function".

When a predetermined time (3 seconds, for example) has elapsed after transmitting light by the above S1, the transmission circuit 11 stops transmission of light and, further, outputs a signal which indicates a transmission stop to the measurement circuit 13 (S2).

(2) Measurement of Time Until Reflected Light Comes not to be Received any More after Transmission Stop of Light Next, when the signal which indicates a transmission stop is inputted from the transmission circuit 11, the measurement circuit 13 starts to measure a time by a clocking function provided in it (S3). It is for the purpose of measuring a time after transmission of light has been stopped.

Next, the measurement circuit 13 distinguishes whether the intensity of reflected light measured latest is the predetermined value or less (S4). It is for the purpose of distinguishing whether reflected light has come not to be received any more or not.

When the intensity of reflected light measured latest is not the predetermined value or less (the case of No in S4), the measurement circuit 13 assumes that reflected light is kept being received, returns to S4, and distinguishes whether the intensity of reflected light measured latest is the predetermined value or less again.

After that, when the intensity of measured reflected light has come to be the predetermined value or less (the case of Yes in S4), the measurement circuit 13 assumes that reflected light has come not to be received any more and stops measurement of a time (S5).

The measured time is a time until reflected light comes not to be received any more after transmission of light has been stopped. As it has been described in above-mentioned (3-6), the time in question corresponds to a time during which light makes a round trip to the farthest light reflection element connected normally even after the occurrence of a failure.

(3) Calculation and Output of the Distance to the Farthest Connected Light Reflection Element Next, the measurement circuit 13 calculates the distance to the farthest light reflection element connected normally based on the measured time (S6).

Specifically, the measurement circuit 13 calculates the product of half of the measured time (time during which light makes a round trip to the farthest light reflection element connected normally even after the failure) and a speed at which light travels in the optical fiber. The speed at which light travels in the optical fiber is calculated by a user of the optical transmitting/receiving device 1 of this example embodiment and set to the measurement circuit 13 in advance as it has been described in the above-mentioned "(3-7) Distance calculation function".

Next, the measurement circuit 13 outputs the distance calculated in S6 (the distance to the farthest light reflection element connected normally even after the failure) as a signal (S7).

(4) Summary of the Processing of S1-S7 Described Above

When there is a failure in an optical fiber, the optical transmitting/receiving device 1 of this example embodiment outputs the distance to the farthest light reflection element connected normally even after the failure by performing the above processing S1-S7. The distance that the optical transmitting/receiving device 1 of this example embodiment outputs is information which indicates that, although there is no failure up to that distance, there is a failure in a section farther than that, that is, information which specifies a faulty section. The optical transmitting/receiving device 1 of this example embodiment can specify a faulty section.

(5) Modification of a Structure and Operations (5-1) An Operation which Makes the Output Destination be a Monitoring Device Although the measurement circuit 13 outputs the distance to the farthest light reflection element connected normally, an output destination of that may be a monitoring device (not shown). In that case, the monitoring device displays the inputted distance on a screen provided in it. A user of the optical transmitting/receiving device 1 can know a faulty section via the monitoring device.

(5-2) About the Predetermined Value Set to the Measurement Circuit 13

In the above, although it has been supposed that the predetermined value set to the measurement circuit 13 is intensity of reflected light when not receiving reflected light (hereinafter, referred to as "non-light-receiving level"), it is not limited to this. The above-mentioned predetermined value may be an optional value that is smaller than the intensity of reflected light which is received from the light reflection element 3_n inserted farthest (hereinafter, referred to as "reflected light level from the farthest element"), and is larger than or equal to the non-light-receiving level.

In order to obtain the above-mentioned reflected light level from the farthest element, a user of the optical transmitting/receiving device 1 transmits light to the optical fiber 2 first, and stops transmission after that. Here, since the distance to the light reflection element 3_n is known, a user of the optical transmitting/receiving device 1 also knows a time zone to receive reflected light from the light reflection element 3_n in advance. After stopping transmission of light, in the time zone to receive reflected light from the light reflection element 3_n, the user of the optical transmitting/receiving device 1 obtains the intensity of reflected light to be measured by the reflected light measuring function as a reflected light level from the farthest element.

The above-mentioned non-light-receiving level and the reflected light level from the farthest element are obtained in a state that the optical fiber 2 is connected and there is no failure in the optical fiber.

(5-3) Operations to Carry Out S4-S6 Repeatedly

As a variation of operations, the measurement circuit 13 may carry out S4-S6 repeatedly until a predetermined time passes after S3. In that case, in S5, the measurement circuit 13 does not stop measurement of a time, and stores a time which has been measured then. Also, in S6, the measurement circuit 13 calculates the product of half of the time stored in S5 and the speed at which light travels in the optical fiber. When a predetermined time has passed, the measurement circuit 13 stops measurement of a time and carry out S7. The above-mentioned predetermined time may be a time on the second time scale. The predetermined time is set by a user of the optical transmitting/receiving device 1 of this example embodiment to the measurement circuit 13.

[Description of the Effect]

According to this example embodiment, when a faulty section of an optical fiber is specified, the optical transmitting/receiving device 1 can reduce the manufacturing cost sufficiently.

The reason will be described below.

First, when specifying a faulty section, the optical transmitting/receiving device 1 of this example embodiment measures a time until reflected light comes not to be received any more after transmission of light has been stopped, and calculates the distance to the farthest light reflection element connected normally even after the failure based on the measured time. Since the above-mentioned time and distance can be measured or calculated even if reflected light from light reflection elements overlap, the optical transmitting/receiving device 1 of this example embodiment does not need to control transmission time of light strictly so as not to make reflected light overlap. Since transmission time of the light does not need to be controlled strictly, the optical transmitting/receiving device 1 of this example embodiment is not required to have a circuit (such as a pulse signal generator and the like) for it, and thus can reduce the manufacturing cost sufficiently.

Furthermore, FIG. 6 is a diagram for additionally describing the effect of the optical transmitting/receiving device 1. As illustrated in FIG. 6, the optical transmitting/receiving device 1 of this example embodiment can specify a faulty section of an optical fiber sufficiently accurately even if light transmitted from the transmission circuit 11 is leaking out to the measurement circuit 13 by any reasons. The reason of this is that the optical transmitting/receiving device 1 of this example embodiment begins measurement after transmission of light is stopped and such leakage disappears.

Second Example Embodiment

Next, the second example embodiment of the present invention will be described.

FIG. 7 is a diagram illustrating an example configuration of a device 100 in the second example embodiment of the present invention. A configuration and operations of the device 100 of the second example embodiment will be described below.

[Description of Structure]

(1) Structure of the Device 100 of the Second Example Embodiment

As indicated in FIG. 7, the device 100 of this example embodiment is connected to an optical fiber 120 into which light reflection elements 110, 111 and 112 to perform reflection of a fixed amount of light are inserted. The device 100 of this example embodiment includes a transmission unit 101, a measurement unit 102, a time measurement unit 103, a distance measurement unit 104 and an output unit 105.

Although not being illustrated, the transmission unit 101 and the measurement unit 102 are connected to the optical fiber 120 via a general optical splitter. The measurement unit 102 is connected to the time measurement unit 103 via a conducting wire. The distance measurement unit 104 is connected to the time measurement unit 103 and the output unit 105 via conducting wires.

(2) Function of Each Part of the Device 100

The transmission unit 101 transmits light to the optical fiber 120 and stops transmission of light.

The transmission unit 101 may transmit light when an electric signal which indicates that a failure has occurred in the optical fiber 120 is inputted. Furthermore, after transmitting light, the transmission unit 101 may stop transmission of light after the lapse of a predetermined time. The predetermined time is an optional time set by a user of the device 100 of this example embodiment to the transmission unit 101.

The measurement unit 102 measures the intensity of reflected light reflected from the light reflection elements 110, 111 and 112.

The time measurement unit 103 measures a time until the intensity of reflected light measured by the measurement unit 102 becomes a predetermined value or less after the transmission unit 101 has stopped transmission of light. This is for the purpose of measuring a time until reflected light comes not to be received any more after transmission of light has been stopped.

The above-mentioned predetermined value may be the intensity of reflected light to be measured by the measurement unit 102 when the transmission unit 101 is not transmitting light, that is, when reflected light is not being received (hereinafter, referred to as "non-light-receiving level" as is the case with the first example embodiment). The predetermined value is set by a user of the device 100 of this example embodiment to the time measurement unit 103.

Meanwhile, a user of the device 100 is allowed to set any numerical value as the predetermined value even if it is larger than or equal to the non-light-receiving level, if it is a numerical value smaller than the intensity of reflected light which is received from the light reflection element 3_$n$ inserted farthest when light is transmitted. The reason of this is that reflected light level in question is the smallest in intensity of reflected light from each light reflection element, and thus an event that reflected light has come not to be received any more can be detected certainly.

The distance measurement unit 104 calculates a distance corresponding to a time measured by the time measurement unit 103.

The output unit 105 outputs a signal which indicates the distance calculated by the distance measurement unit 104.

[Description of Operations]

Next, operations of the device 100 of this example embodiment will be described.

First, it is supposed that a user of the device 100 of this example embodiment who has recognized a failure of the optical fiber 120 pushes down a button provided in the device 100, and the device 100 whose button is pushed down outputs an electric signal indicating that a failure has occurred in the optical fiber 120 to the transmission unit 101. The electric signal which indicates that a failure has occurred is inputted to the transmission unit 101.

(1) Transmission and Stopping of Light

When an electric signal which indicates that a failure has occurred in the optical fiber 120 is inputted, the transmission unit 101 transmits light to the optical fiber 120.

After the transmission, reflected light of the same wavelength returns from each light reflection elements 110, 111 and 112 on the optical fiber 120 to the transmission unit 101 in an overlapping manner. At that time, the measurement unit 102 is measuring intensity of received reflected light repeatedly.

After transmitting light, the transmission unit 101 stops transmission of light.

(2) Measurement of a Time Until Reflected Light Comes not to be Received any More The time measurement unit 103 measures a time until the intensity of reflected light measured by the measurement unit 102 becomes a predetermined value (non-light-receiving level) or less after the transmission unit 101 has stopped transmission of light. That is, the time measurement unit 103 measures a time until reflected light comes not to be received any more after transmission of light has been stopped.

The measured time is a time during which light makes a round trip to the farthest light reflection element connected normally even after the failure.

(3) Calculation and Output of the Distance to the Farthest Connected Light Reflection Element Next, the distance measurement unit 104 calculates the distance corresponding to the time measured by the time measurement unit 103.

Specifically, the distance measurement unit 104 calculates the product of half of the measured time (the time during which light makes a round trip to the farthest light reflection element connected normally even after the failure) and a speed at which light travels in the optical fiber. The speed at which light travels in the optical fiber can be obtained by dividing the speed of light by the refractive index of the optical fiber, and in the case of an optical fiber using a general silica glass, it is 20557.927 [km/s]. The speed at which light travels in the optical fiber is set by a user of the device 100 to the distance measurement unit 104 in advance.

Next, the output unit 105 outputs a signal which indicates the distance calculated by the distance measurement unit 104 (that is, the distance to the farthest light reflection element connected normally even after the failure).

The distance indicated by the outputted signal is information which indicates that there is a failure in a section farther than that, that is, information which specifies a faulty section. The optical transmitting/receiving device 1 of this example embodiment can specify a faulty section.

In the above, although it has been described about the case where light reflection elements inserted into the optical fiber 120 are three of the light reflection elements 110, 111 and 112, they are not limited to three. Three or more light reflection elements may be inserted in the optical fiber 120, or two or less of them may be inserted.

[Description of the Effect]

According to this example embodiment, when a faulty section of an optical fiber is specified, the manufacturing cost of a device can be reduced sufficiently.

The reason will be described below.

First, at the time when a faulty section is specified, a device of this example embodiment measures a time until reflected light comes not to be received any more after transmission of light has been stopped, and calculates the distance to the farthest light reflection element connected normally even after a failure based on the measured time. Since the above time and distance can be measured or calculated even if reflected light from light reflection elements overlaps, a device of this example embodiment does not need to control transmission time of light strictly so as not to make reflected light overlap. Since transmission time of the light does not need to be controlled strictly, a device of this example embodiment is not required to have a circuit for controlling a transmission time of the light strictly (such as a pulse signal generator and the like), and thus can reduce the manufacturing cost sufficiently.

The whole or part of the example embodiments disclosed above can be described as, but not limited to, the following supplementary notes.

(Supplementary Note 1)

A device connected to an optical fiber into which a light reflection element to perform reflection of light of a fixed amount is inserted, the device comprising:

a transmission means for transmitting light to the optical fiber, and stopping the transmission;

a measurement means for measuring intensity of reflected light reflected from the light reflection element;

a time measurement means for measuring a time until intensity of the reflected light to be measured by the measurement means comes to be a predetermined value or less after the transmission means stops transmission of the light;

a distance measurement means for calculating a distance corresponding to the time having been measured by the time measurement means; and an output means for outputting a signal indicating the distance, wherein the predetermined value is equal to or more than intensity of the reflected light when not transmitting the light, and is a value smaller than intensity of the reflected light to be received from the light reflection element inserted farthest when the light is transmitted.

(Supplementary Note 2)

The device according to Supplementary Note 1, wherein the predetermined value is intensity of the reflected light when the light is not being transmitted.

(Supplementary Note 3)

The device according to any one of Supplementary Notes 1 to 2, wherein the transmission means transmits the light for a predetermined time on a second time scale.

(Supplementary Note 4)

The device according to any one of Supplementary Notes 1 to 3, wherein the distance measurement means calculates, as the distance, a value corresponding to a product of half of the time and a predetermined speed at which light travels in the optical fiber.

(Supplementary Note 5)

The device according to any one of Supplementary Notes 1 to 4, wherein the device is connected to a monitoring device including a display means for displaying information indicated by an inputted signal, and wherein the output means outputs a signal indicating the distance to the monitoring device.

(Supplementary Note 6)

A specifying method comprising:

transmitting light to an optical fiber into which a light reflection element to perform reflection of light of a fixed amount is inserted;

measuring intensity of reflected light reflected from the light reflection element;

stopping transmission of the light;

measuring a time until intensity of the reflected light to be measured comes to be a predetermined value or less after stopping of transmission of the light;

calculating a distance corresponding to the measured time; and outputting a signal indicating the distance, wherein the predetermined value is equal to or more than intensity of the reflected light when not transmitting the light, and is a value smaller than intensity of the reflected light to be received from the light reflection element inserted farthest when the light is transmitted.

(Supplementary Note 7)

The specifying method according to Supplementary Note 6, wherein the predetermined value is intensity of the reflected light when the light is not being transmitted.

(Supplementary Note 8)

The specifying method according to any one of Supplementary Notes 6 to 7, wherein, when performing the transmission, the light is transmitted for a predetermined time on a second time scale.

(Supplementary Note 9)

The specifying method according to any one of Supplementary Notes 6 to 8, wherein, when calculating the distance, a value corresponding to a product of half of the time and a predetermined speed at which light travels in the optical fiber is calculated as the distance.

(Supplementary Note 10)

The specifying method according to any one of Supplementary Notes 6 to 9, wherein
information indicated by an inputted signal is displayed.

(Supplementary Note 11)

The device according to any one of Supplementary Notes 1 to 5, wherein
the light reflection element is an optical fiber grating.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2015-128091 filed on Jun. 25, 2015, the disclosure of which is incorporated herein in its entirety by reference.

REFERENCE SIGNS LIST

1 Optical transmitting/receiving device
2, 14 and 15 Optical fiber
3_1, 110, 111 and 112 Light reflection element
4 Optical transmitting/receiving device
11 Transmission circuit
12 Beam splitter
13 Measurement circuit
100 Device
101 Transmission unit
102 Measurement unit
103 Time measurement unit
104 Distance measurement unit
105 Output unit

The invention claimed is:

1. A device connected to an optical fiber into which a light reflection element to perform reflection of light of a fixed amount is inserted, the device comprising:
a transmission circuit which transmits light to the optical fiber, and stopping the transmission;
a measurement circuit which measures intensity of reflected light reflected from the light reflection element;
a time measurement circuit which measures a time until intensity of the reflected light to be measured by the measurement circuit comes to be a predetermined value or less after the transmission circuit stops transmission of the light;
a distance measurement circuit which calculates a distance corresponding to the time having been measured by the time measurement circuit; and
an output circuit which outputs a signal indicating the distance, wherein
the predetermined value is equal to or more than intensity of the reflected light when not transmitting the light, and is a value smaller than intensity of the reflected light to be received from the light reflection element inserted farthest when the light is transmitted.

2. The device according to claim 1, wherein
the predetermined value is intensity of the reflected light when the light is not being transmitted.

3. The device according to claim 1, wherein
the transmission circuit transmits the light for a predetermined time on a second time scale.

4. The device according to claim 1, wherein
the distance measurement circuit calculates, as the distance, a value corresponding to a product of half of the time and a predetermined speed at which light travels in the optical fiber.

5. The device according to claim 1, wherein
the device is connected to a monitoring device which displays the distance indicated by an inputted signal, and wherein
the output circuit outputs a signal indicating the distance to the monitoring device.

6. A specifying method of a device connected to an optical fiber, the specifying method comprising:
transmitting light to an optical fiber into which a light reflection element to perform reflection of light of a fixed amount is inserted;
measuring intensity of reflected light reflected from the light reflection element;
stopping transmission of the light;
measuring a time until intensity of the reflected light to be measured comes to be a predetermined value or less after stopping of transmission of the light;
calculating a distance corresponding to the measured time; and
outputting a signal indicating the distance, wherein
the predetermined value is equal to or more than intensity of the reflected light when not transmitting the light, and is a value smaller than intensity of the reflected light to be received from the light reflection element inserted farthest when the light is transmitted.

7. The specifying method according to claim 6, wherein
the predetermined value is intensity of the reflected light when the light is not being transmitted.

8. The specifying method according to claim 6, wherein, when performing the transmission, the light is transmitted for a predetermined time on a second time scale.

9. The specifying method according to claim 6, wherein, when calculating the distance, a value corresponding to a product of half of the time and a predetermined speed at which light travels in the optical fiber is calculated as the distance.

10. The specifying method according to claim 6, wherein information indicated by an inputted signal is displayed.

11. The device according to claim 1, wherein
the light reflection element is an optical fiber grating.

* * * * *